United States Patent
Danieau et al.

(10) Patent No.: US 9,717,997 B2
(45) Date of Patent: Aug. 1, 2017

(54) METHOD TO RENDER GLOBAL 5 DOF MOTION EFFECT WITH MULTIPLE LOCAL FORCE-FEEDBACK

(71) Applicant: THOMSON LICENSING, Issy de Moulineaux (FR)

(72) Inventors: Fabien Danieau, Rennes (FR); Julien Fleureau, Rennes (FR); Philippe Guillotel, Vern dur Seiche (FR); Nicolas Mollet, Meillac (FR); Anatole Lecuyer, Rennes (FR)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

(21) Appl. No.: 14/391,496

(22) PCT Filed: Apr. 10, 2013

(86) PCT No.: PCT/EP2013/057443
§ 371 (c)(1),
(2) Date: Oct. 9, 2014

(87) PCT Pub. No.: WO2013/153086
PCT Pub. Date: Oct. 17, 2013

(65) Prior Publication Data
US 2015/0061847 A1    Mar. 5, 2015

(30) Foreign Application Priority Data

Apr. 13, 2012  (EP) ..................... 12305441
Jul. 11, 2012  (EP) ..................... 12305831

(51) Int. Cl.
*A63G 31/16*  (2006.01)
*G09B 9/00*   (2006.01)
(Continued)

(52) U.S. Cl.
CPC .............. *A63G 31/16* (2013.01); *G06F 3/016* (2013.01); *G08B 6/00* (2013.01); *G09B 9/00* (2013.01);
(Continued)

(58) Field of Classification Search
CPC .............. A63F 2300/1037; A63F 13/00; A63F 2300/10; G06F 3/016; G08B 6/00; A63G 31/16; A47C 15/004; G09B 9/00
See application file for complete search history.

(56) References Cited

U.S. PATENT DOCUMENTS 3,919,691 A * 11/1975 Noll ................... G06F 3/016
                                                    340/407.1
5,553,148 A    9/1996 Werle
(Continued)

FOREIGN PATENT DOCUMENTS

JP   2000089894   3/2000
JP   2000126158   3/2000
(Continued)

OTHER PUBLICATIONS

Bachmann et al.: "Design and Implementation of MARG Sensors for 3 DOF Orientation Measurement of Rigid Bodies"; The Moves Institute—Naval Postgraduate School; Dec. 31, 2003 (Dec. 31, 2003); pp. 1171-1178.
(Continued)

*Primary Examiner* — Hongmin Fan
(74) *Attorney, Agent, or Firm* — Tutunjian & Bitetto P.C.

(57) ABSTRACT

In order to generate force feedback data for a haptic device for providing simulated six degrees of freedom movement, a three dimensional acceleration component corresponding to the movement to be simulated is determined, a three dimensional velocity component corresponding to the movement to be simulated is determined and control signals
(Continued)

for controlling at least three force feedback devices are determined, wherein each of the three force feedback devices provides three dimensional force effects to a fixation point associated to each of it, the three force feedback devices being arranged at defined positions with regard to each other, and the three fixation points define a geometric plane.

19 Claims, 4 Drawing Sheets

(51) Int. Cl.
 *G08B 6/00* (2006.01)
 *G06F 3/01* (2006.01)
 *A63F 13/00* (2014.01)

(52) U.S. Cl.
 CPC .......... *A63F 13/00* (2013.01); *A63F 2300/10* (2013.01); *A63F 2300/1037* (2013.01)

(56) References Cited

U.S. PATENT DOCUMENTS

| | | | |
|---|---|---|---|
| 5,669,818 | A | 9/1997 | Thorner et al. |
| 2006/0079817 | A1 | 4/2006 | Dewald |
| 2009/0282331 | A1* | 11/2009 | Nagasaka ............... G06F 3/014 715/701 |
| 2009/0282332 | A1 | 11/2009 | Porat |
| 2010/0100256 | A1 | 4/2010 | Jurmain et al. |
| 2012/0302323 | A1* | 11/2012 | Gagner ............... G07F 17/3202 463/25 |
| 2013/0187930 | A1* | 7/2013 | Millman ............... G06T 13/20 345/473 |

FOREIGN PATENT DOCUMENTS

| | | | |
|---|---|---|---|
| JP | 2001271871 | | 10/2001 |
| JP | 2007135633 | * | 6/2007 ............... A47C 7/38 |
| JP | 2010021425 | | 1/2010 |
| WO | WO2005074753 | | 8/2005 |
| WO | WO2011032937 | | 3/2011 |

OTHER PUBLICATIONS

Dasgupta: "The Stewart Platform Manipulator A Review"; Mechanism and Machine Theory, vol. 35, No. 1; Jan. 1, 2000 (Jan. 1, 2001), pp. 15-40.
Search Report Dated Jun. 4, 2013.
Shah et al., "How to build an inexpensive 5-DOF haptic device using two Novint Falcons"; EuroHaptics: Generating and Perceiving Tangible Sensations, Springer-Verlag, Berlin, 2010, pp. 136-143.
Khan et al—Kinematics and Dynamics of a Novel 6-DOF Tau Haptic Device—Journal of Computer Aided Design and Computer Graphics—vol. 22, No. 2 198-203—Feb. 2010.
Tong, et al—"Haptic Rendering Based on Frame-Skeleton for Deformable Object Simulationpublication Data":Organization: Sch. of Instrum. Sci. & Eng., Southeast Univ., Nanjing | Sch. of Inf. & Control, Nanjing Univ. of Inf. Sci. &Technol., Nanjing Source: Journal of Computer Aided Design & Computer Graphics | vol. 22, No. 2 | 198-203 | Feb. 2010 PUBLISHER: Science Press Document Type: Journal Paper Language: ChineseISSN: 1003-9775SICI:.
Lin, et al. "5-D Force Control System for Fingernail Imaging Calibration" 2011 IEEE International Conference on Robotics and Automation; May 2011, pp. 1374-1379.

* cited by examiner

METHOD TO RENDER GLOBAL 5 DOF MOTION EFFECT WITH MULTIPLE LOCAL FORCE-FEEDBACK

This application claims the benefit, under 35 U.S.C. §365 of International Application PCT/EP2013/057443, filed Apr. 10, 2013, which was published in accordance with PCT Article 21(2) on Oct. 17, 2013 in English and which claims the benefit of European patent application No. 12305441.3 filed Apr. 13, 2012 and European patent application No. 12305831.5, filed Jul. 11, 2012.

The present invention relates to a method and device for automatically generating force feedback data for a haptic device for providing simulated six degrees of freedom (6-DoF) movement.

Motion simulators are well-known devices designed to make an audience member feel motion. They are intensively used as driving or flight simulators for learning purposes. Most of them are based on the Stewart's platform (B. Dasgupta, "The Stewart platform manipulator: a review", Mechanism and Machine Theory, Vol. 35, Issue 1, pp. 15-40, January 2000). It is a six degrees of freedom (6-DoF) platform moving thanks to six hydraulic cylinders. A six degrees of freedom platform moves in three directions, e.g. in two directions in the horizontal plane and in a movement direction along the vertical axis. Further, rotation around these three directions is performed. A motion simulator is basically a seat attached on this kind of platform that may be especially used to enhance audiovisual experience. Here, the seat moves while the audience member is watching a movie to enhance his experience. These systems are intensively used in amusement park or in "4D cinemas", but few of them are designed for the end-user consumer.

Also comfortable chairs placed on four actuators dedicated to the end-user living-room are known in the art. These seats allow three degrees of freedom (pitch, roll and heave) for audiovisual content viewing and consumer applications. The three degrees of freedom are movement along the vertical axis (heave) and rotation around two perpendicular horizontal axes (pitch and roll). But these chairs remain expensive, render only 3-DoF and are still based on a Stewart's platform.

In a less invasive way, the sensation of motion may also be induced by a force feedback device, as disclosed in WO2011/032937. By applying a force on the user's hand, the system generates an illusion of motion with force feedback. While the interface is pulling the hand, the user feels moving forward.

A lot of force feedback devices have been proposed to enable local interaction with a user. Typically, 3-DoF force feedback devices are able to provide force effects along three perpendicular axes. FIG. 1 shows an example of a 3-DoF force feedback device 1. It is relatively inexpensive and it is designed for the mass-market. It has a handgrip acting as a fixation point 2, to which a three dimensional force is applied. Also, other 3-DoF devices exist.

A. Shah, S. Teuscher, E. McClain, and J. Abbott, "How to build an inexpensive 5-DOF haptic device using two novint falcons," Haptics: *Generating and Perceiving Tangible Sensations*, pp. 136-143, 2010, disclose two 3-DoF force feedback devices 1, which are connected to each other to provide one 5-DoF force feedback system as disclosed in FIG. 2. The handgrip 2 of each device is linked by a stylus 3. This way the stylus 3 is manipulated along three perpendicular axes and rotated around two of these axes.

It is an object of the invention to propose a low cost device and a method for operating the same for rendering 6-DoF interactions.

According to the invention, a method for automatically generating force feedback data for a haptic device is disclosed. By providing force feedback a six degrees of freedom movement is simulated. A first step consists of determining a three dimensional acceleration component corresponding to the movement to be simulated. A second step consists of determining a three dimensional angular velocity component corresponding to the movement to be simulated. A third step consists of determining control signals for controlling at least three force feedback devices. Each of the three force feedback devices has a fixation point associated to it and provides force effects along three perpendicular axes to its fixation point. The three force feedback devices are arranged at defined positions with regard to each other and the three fixation points define a geometric plane. Thus, the fixation points are arranged in a coplanar way but do not lie on a straight line. The method according to the invention has the advantage that a six degrees of freedom movement is simulated with low cost equipment. Three degrees of freedom force feedback devices are available in the consumer electronic market and are available for these application at reasonable prices.

Preferably, three dimensional displacement of each fixation point depending on the three dimensional acceleration component and the three dimensional angular velocity is determined and is a basis for determining control signals for controlling the at least three force feedback devices. This has the advantage that an angular movement is simulated using devices that as standalone devices are only able to provide three dimensional movements.

Advantageously, a scaling factor is determined. The scaling factor is used for scaling the three dimensional displacement such that the workspace of the force feedback devices is well utilized. The scaling factor is determined after three dimensional displacement values have been determined, which are applicable for a full sequence to be simulated. Thus, the maximum displacement for this full sequence is known and the scaling factor is determined such that the workspace is fully used in at least one dimension of the force feedback devices. Another solution is to adapt the scaling factor continuously to the three dimensional displacement. This is done by integration of the three dimensional displacement over a certain time. Other rules for scaling to optimally use the three dimensional workspace of the force feedback devices and at the same time to preserve the ratio between the determined displacements in different directions and for different force feedback devices are applicable.

Advantageously, the force feedback devices are located in the left armrest, the right armrest and the headrest of a chair, respectively. Thus, the three dimensional displacements of the three fixation points are determined by the assumption that the fixation points are located in the left armrest, the right armrest and the headrest of a chair, respectively. The defined fixation points thus provide the illusion of a six degrees of freedom movement to a user who contacts with his left arm, right arm and head one of the fixation points, respectively.

Advantageously, the three dimensional displacement of each fixation point is based on a skeleton model. Further, the movement to be simulated is based on at least part of a movie or gaming content. This has the advantage that a user sitting on a chair in front of a TV or computer gets the illusion of six degrees of freedom movement synchronized to the audiovisual content he is seeing by a cheap and handy device which can be easily used as home equipment.

According to a further aspect of the invention, a device for rendering six degrees of freedom interactions is disclosed. The device consists of at least three force feedback devices. Each of the three force feedback devices provides force effects to a fixation point along three perpendicular axes. The three force feedback devices are arranged at defined positions with regard to each other and the three fixation points define a geometric plane. Thus, the fixation points are arranged in a coplanar way but do not lie on a straight line. The defined positions of the force feedback devices being fixed positions. Alternatively, the defined positions of the force feedback devices might also move over time, such that the displacement of the fixation point is a superimposed movement of the displacement of the force feedback device and the displacement of the fixation point with regard to the force feedback device. Further, the fixation points being arranged such that a user stands with each of his feet on one fixation point and e.g. leans against the third fixation point. Any other arrangement in which the three fixation points have contact to a user and define a geometric plane is applicable.

Advantageously, the device is integrated into a chair and one of the force feedback devices is integrated into the left armrest, the right armrest and the headrest, respectively.

Advantageously, at least one further force feedback device is integrated into at least one legrest. This does not provide a further degree of freedom but supports the artificial six degrees of freedom simulation provided to the user. In this way all the remote parts of the human body are stimulated with the artificial movement while the main part of the body still does not move. The inventors found that, contrary to known 6-DoF simulators, it is not necessary to move the whole body in order to generate a 6-DoF feeling in a user, but that moving at least 3 remote parts of the body is sufficient for this purpose.

Advantageously, the device includes a control unit that generates control signals to control the at least three force feedback devices dependent on each other in a way that the movements of the fixation points of the at least three force feedback devices provide six degrees of freedom movement to an object fixed between the three fixation points. The object fixed between the three fixation points might be any object and especially might also be a human being. Also, further force feedback devices might be used to increase the number of fixation points and thus to enhance the illusion of six degrees of freedom movement.

For better understanding the invention shall now be explained in more detail in the following description with reference to the figures. It is understood that the invention is not limited to this exemplary embodiment and that specified features can also expediently be combined and/or modified without departing from the scope of the present invention.

Figure 3:
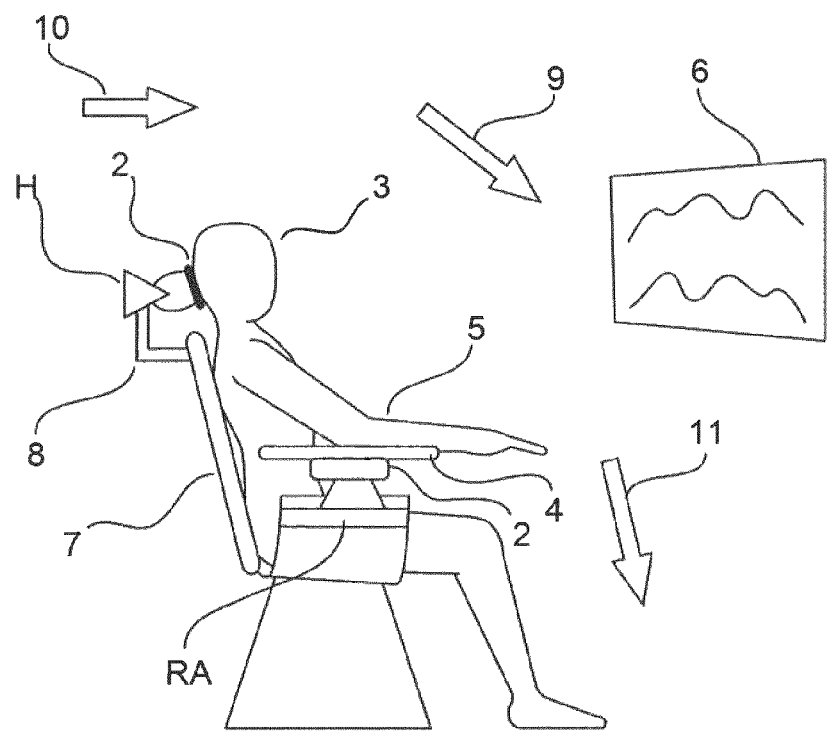
FIG. 3 shows a 6-DoF force feedback system according to the invention
Figure 4:
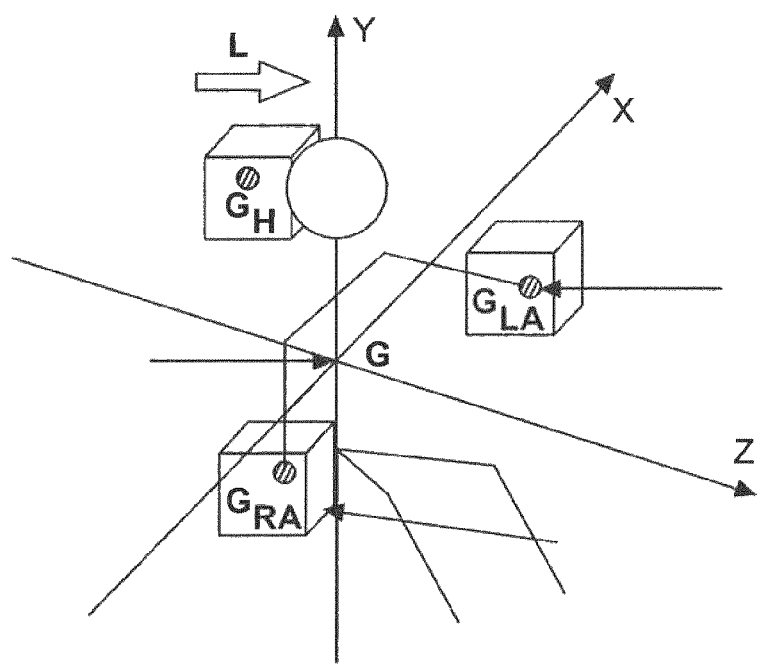
Figure 5:
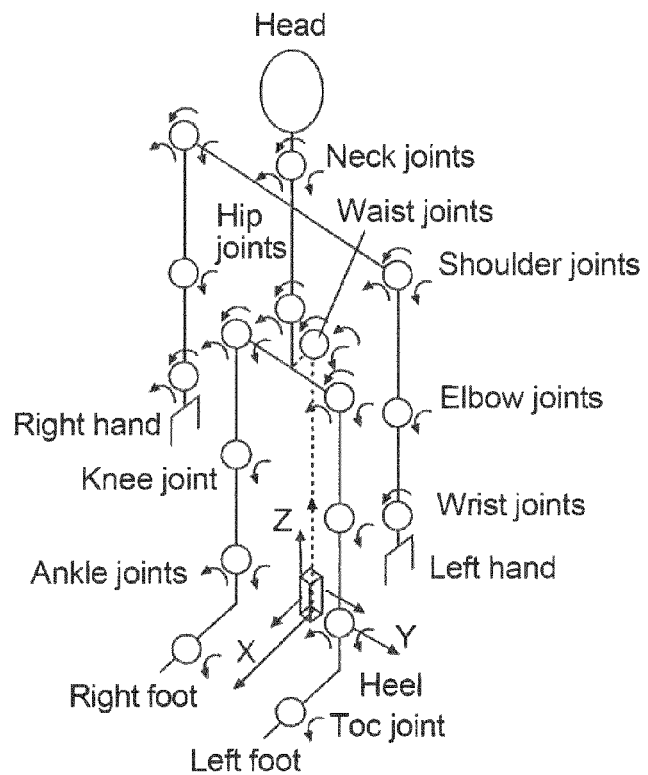
Figure 6:
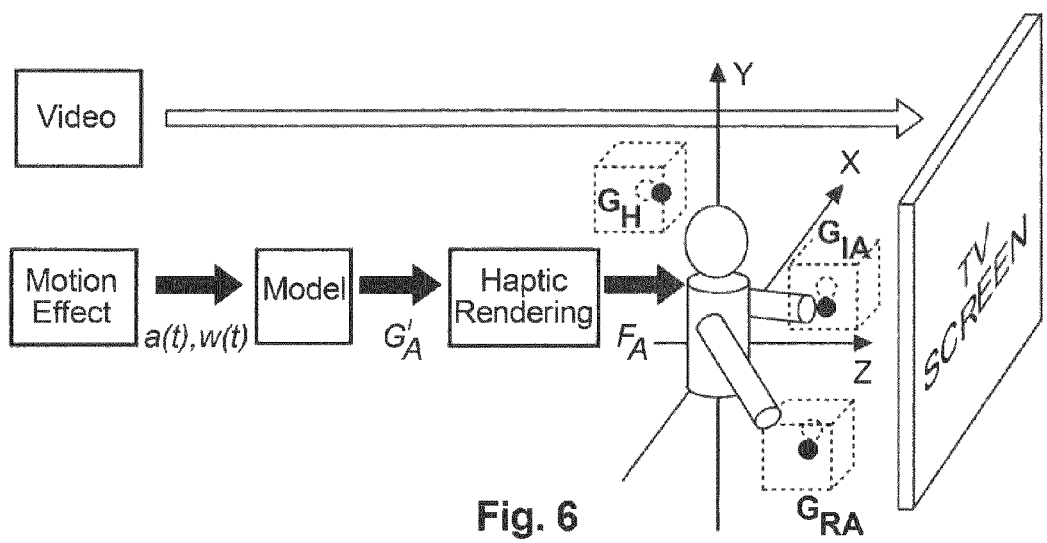
Figure 7:
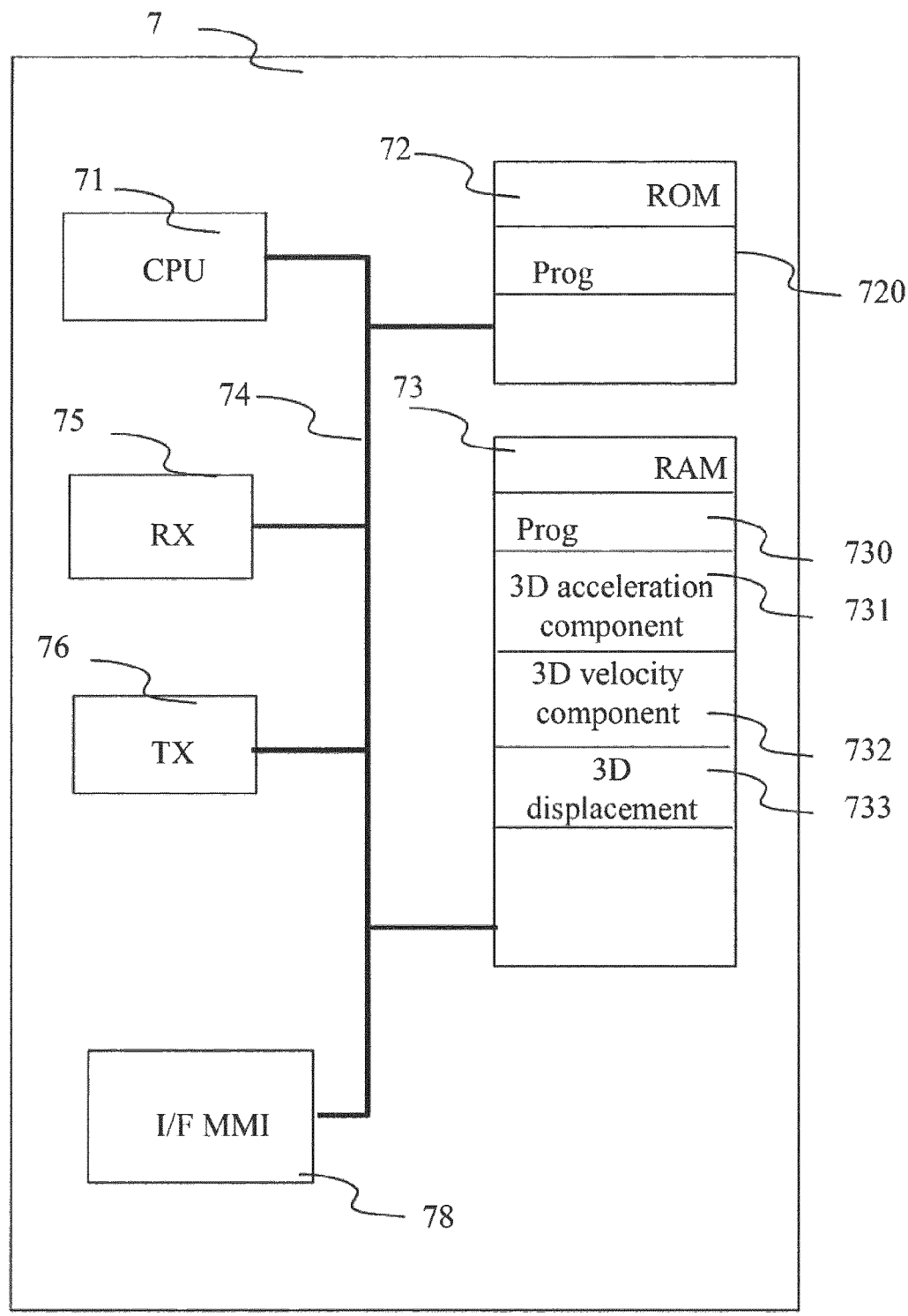

FIG. 4 shows a schematic view on the 6-DoF force feedback system according to the invention FIG. 5 shows a skeleton model FIG. 6 shows a schematic view of the system according to the invention including the extraction of motion data, haptic rendering and force feedback system FIG. 7 shows a schematic view of a control unit configured for controlling the 6-DoF force feedback system of FIG. 3, according to a particular embodiment of the invention.

Figure 1:
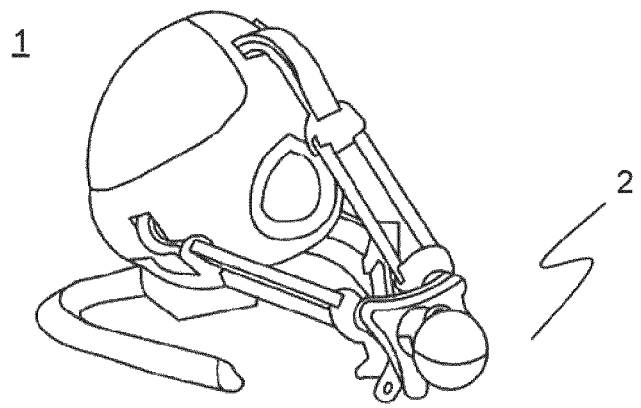
FIG. 1 shows a 3-DoF force feedback device
Figure 2:
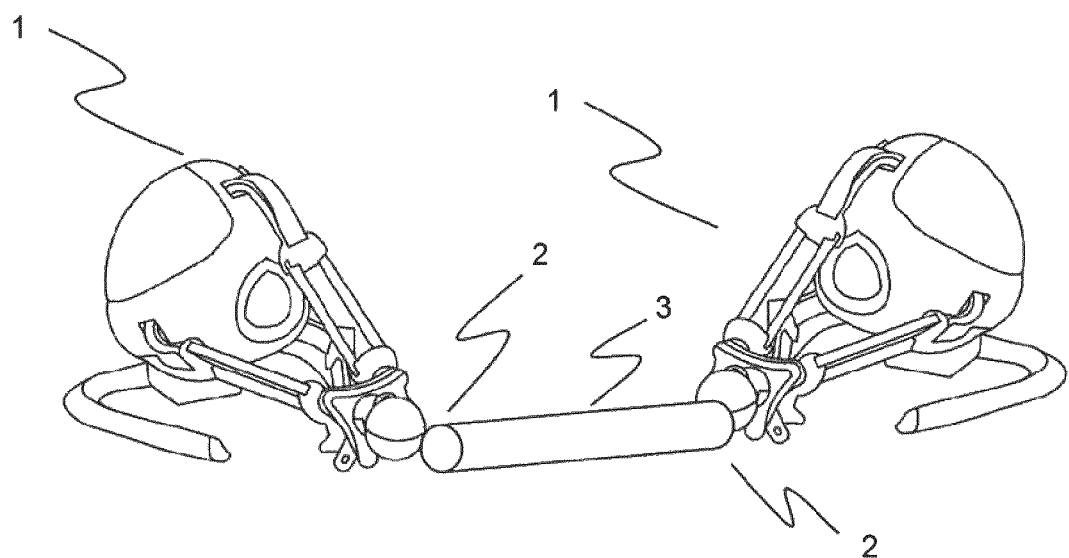
FIG. 2 shows a 5-DoF force feedback system built by two 3-DoF devices

FIG. 1 and FIG. 2 are already described in the introduction above.

FIG. 3 shows an exemplary embodiment of the invention. A user sits on a chair 7 and has contact to a fixation point 2 of a 3-DoF force feedback device H with his head/neck 3, and two further 3-DoF force feedback devices RA, LA with his left arm and his right arm 5, respectively. In FIG. 3, only the right arm 5 of the user and the right armrest 4 of the chair is shown for sake of simplicity. The arms 5 of the user lie on armrests 4, which transmit the movement of the fixation points 2 of the force feedback devices RA, LA to the users arms 5. Alternatively, the arms 5 of the user might contact the fixation points 2 directly. The force feedback device H which moves the head 3 of the user is mounted to the chair 7 by a fixture 8. Thus, the embodiment makes use of three 3-DoF local actuators to render a 6-DoF global motion (3×3-DoF→6-DoF). In front of the user, a display screen 6 is arranged on which audiovisual content is presented. FIG. 3 shows specific examples of the movements of the fixation points 2 of the force feedback devices H, RA, LA. The movement of the fixation point 2 of the force feedback device H mounted at the users head is indicated by arrow 10. The movement of the fixation point 2 of the force feedback device RA mounted in the right armrest 4 is indicated by arrow 11. The 6-DoF illusion of motion which is generated is indicated by the curved arrow 9.

FIG. 4 introduces a schematic representation of the system as well as an introduction to the different notations that are used in the following.

The system is made of three local 3-DoF force feedback devices H, RA, LA respectively placed behind the head of the user and under the right and left forearms of the user. The force feedback devices H, RA, LA are preferably placed in the headrest, left armrest and right armrest of a chair (not shown here). The user passively rests its head and hands (or arms) on each of the 3-DoF force feedback devices H, RA, LA, while he is watching a movie projected on the display screen placed in front of him. If no motion is rendered, the three force feedback devices H, RA, LA maintain the head, right arm and left arm of the user at the central positions $G_H$, $G_{RA}$, $G_{LA}$, respectively. After the viewing sequence has started and motion is rendered, each force feedback device H, RA, LA superimposes 3-DoF motions of the different associated part of the body in a limited workspace schematically indicated by the three boxes shown in FIG. 4. The workspace corresponds to the maximum amplitude L of the 3-DoF force feedback device H, RA, LA in each direction.

The proposed system aims at making the audience member feel a global 6-DoF motion. An audiovisual content augmented with some extra information concerning the main motion observed in a scene is described in terms of linear accelerations $a(t)=[a_x(t), a_y(t), a_x(t)]^T$ (the gravity component being removed) and angular velocity $w(t)=[w_x(t), w_y(t), w_x(t)]^T$ for each time t. The 6-DoF global motion is modeled by the quantities $a(t)$ and $w(t)$.

While the user is watching the audiovisual content, the three local force feedback devices H, RA, LA move in a synchronized way to give the illusion of the global motion represented by $a(t)$ and $w(t)$. More precisely, each force feedback device H, RA, LA renders the motions that would be felt in different parts of the body. A first force feedback device H would especially render the motion felt at the head position, whereas two other force feedback devices RA, LA render the motions felt by the hands.

FIG. 5 discloses a generalized poly-articulated skeleton, made of body segments and joints, which is used to calculate the propagation of forces to the desired body parts. In the case described above, it targets the hands/arms and the head. If additional actuators are considered, this generalized skeleton directly allows to take them into account.

A first simplified implementation of the skeleton is considered through a rigid body approach, where the motions of the hands are considered equivalent to the movements of the shoulders.

The upper part of the body, including the head and the chest, is considered as a turning rigid body which angular velocity (or turn-rate) is represented by the tridimensional vector w(t) and which acceleration expressed in G is a(t). Both quantities are considered to be relative to the navigation frame $F_N$ and are expressed in the body frame $F_B$ (centered in G).

The coordinates of the head $P_H$, and the coordinates of the left and right shoulders $P_{LS}$, $P_{RS}$ are known in $F_B$. The accelerations in each of those points are computed by the following mechanical relation (time derivation of the kinetic torsor):

$$\vec{a}(P \in S \mid F_N) = a(G \in S \mid F_N) + \frac{dw}{dt} \times \overrightarrow{GP} + w \times (w \times \overrightarrow{GP})$$

The command law to control the three local actuators is then formulated in terms of displacement from their initial and central position $G_H$, $G_{LA}$, $G_{RA}$ by:

$$\overrightarrow{G_H G'_H} = \begin{bmatrix} k_x & 0 & 0 \\ 0 & k_y & 0 \\ 0 & 0 & k_z \end{bmatrix} \left( a(t) + \frac{dw}{dt}(t) \times \overrightarrow{GP_H} + w(t) \times (w(t) \times \overrightarrow{GP_H}) \right)$$

$$\overrightarrow{G_{LA} G'_{LA}} = \begin{bmatrix} k_x & 0 & 0 \\ 0 & k_y & 0 \\ 0 & 0 & k_z \end{bmatrix} \left( a(t) + \frac{dw}{dt}(t) \times \overrightarrow{GP_{LS}} + w(t) \times (w(t) \times \overrightarrow{GP_{LS}}) \right)$$

$$\overrightarrow{G_{RA} G'_{RA}} = \begin{bmatrix} k_x & 0 & 0 \\ 0 & k_y & 0 \\ 0 & 0 & k_z \end{bmatrix} \left( a(t) + \frac{dw}{dt}(t) \times \overrightarrow{GP_{RS}} + w(t) \times (w(t) \times \overrightarrow{GP_{RS}}) \right)$$

where $G'_H$, $G'_{LA}$ and $G'_{RA}$ are the new application points at instant t, and $k_x$, $k_y$, $k_z$ are scaling factors to map the true motions in the workspaces of the three actuators.

Those scaling factors are determined to use the workspace of each force feedback device H, RA, LA in an optimum way, by especially finding a compromise to avoid any saturation while using the biggest space available in each workspace (to have a larger amplitude in the final rendering and thus larger feelings for the user).

Determining those scaling factors is made by a preprocessing step consisting in finding the maximum amplitude of each acceleration rendered by the three different actuators. Thereby, the maximum amplitude of a full sequence is considered. Alternatively, the scaling factor is adapted continuously to the three dimensional displacement. This is done by integration of the three dimensional displacement over a certain time.

FIG. 6 shows a schematic view of the system according to the invention. Motion data are extracted from the audiovisual content. A model is generated. The haptic effects are rendered and control signals to control the force feedback devices are determined. A system according to FIG. 4 is controlled by these control signals and a user watching audiovisual content in front of a TV screen is penetrated by the three force feedback devices.

FIG. 7 diagrammatically illustrates a hardware embodiment of a control unit 7 configured for controlling the haptic device providing simulated six degrees of freedom movement. The control unit 7 comprises the following elements, connected together by a bus 74 of addresses and data that also transports a clock signal:

One or more microprocessor 71 (or CPUs);
a non-volatile memory of the ROM ("Read Only Memory") type 72;
a random access memory or RAM 73;
an interface 75 suitable for receiving data (for example the information added to the audiovisual content and representative of the main motion in the scene in terms of linear accelerations a(t) and angular velocity w(t) at different times t);
an interface 76 suitable for transmitting data (for example control signals for controlling the at least three force feedback devices);
an MMI (Man Machine Interface) interface 38 or a specific application adapted for the display of information for a user and/or the input of data or parameters.

It is noted that the word "register" used in the description of the memories 72 and 73 designates, in each of the memories mentioned, a memory zone of low capacity (some binary data) as well as a memory zone of large capacity (enabling a whole programme to be stored or all or part of the data representative of data received or to be broadcast).

The memory ROM 72 comprises in particular:
a program 'prog' 720.

The algorithms implementing the steps of the method specific to the invention and described below are stored in the ROM 72 memory associated with the control unit 7 implementing these steps. When powered up, the microprocessor(s) 71 loads and runs the instructions of these algorithms.

The random access memory 73 comprises in particular:
in a register 730, the operating programme of the microprocessor 71 responsible for switching on the control unit 7;
data 731 representative of three dimensional acceleration component;
data 732 representative of three dimensional velocity component;
data 733 representative of three dimensional displacement of each fixation point associated with the force feedback devices.

The interfaces 75 and 76 are of the radio type and/or of the Ethernet type.

Naturally, the invention is not limited to the embodiments previously described.

In particular, the invention is not limited to a method of automatic generation force feedback data for a haptic device but also extends to any device implementing this method and any device configured for controlling such an haptic device, and notably any devices comprising at least one CPU. The implementation of calculations necessary to generate the signals for controlling the haptic device may be implemented in any program type, for example programs that can be executed by a CPU type microprocessor.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, set-top boxes, tablets, gaming consoles.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of automatic generation of force feedback data for a haptic device, wherein the method comprises:
    determining a three dimensional acceleration component corresponding to a movement to be simulated;
    determining a three dimensional velocity component corresponding to the movement to be simulated;
    determining control signals for controlling three force feedback devices, wherein each of the three force feedback devices provides three dimensional force effects to a fixation point associated with each of the three force feedback devices, the three force feedback devices being arranged at defined positions with regard to each other, and the three fixation points define a geometric plane, the defined positions moving over time.

2. The method according to claim 1, wherein the determining of the control signals for controlling the three force feedback devices comprises determining three dimensional displacement of each fixation point depending on the three dimensional acceleration component and the three dimensional angular velocity.

3. The method according to claim 2, wherein the determining of the three dimensional displacement of each fixation point comprises: applying a scaling factor to scale the three dimensional displacements to be determined such that the workspace of the force feedback devices is utilized.

4. The method according to claim 1, wherein the three dimensional displacements of the three fixation points are determined under the assumption that the fixation points are located in a left armrest, a right armrest and a headrest of a chair, respectively.

5. The method according to claim 1, wherein the determining of the three dimensional displacement of each fixation point is based on a skeleton model.

6. The method according to claim 1, wherein the movement to be simulated being based on at least part of a movie or gaming content.

7. The method according to claim 6, wherein the movement to be simulated is controlled back according to said at least part of a movie or gaming content.

8. A device configured for rendering haptic interactions, wherein the device comprises at least three force feedback devices, wherein each of the three force feedback devices provides three dimensional force effects to a fixation point and the three force feedback devices are arranged at defined positions with regard to each other, and the three fixation points define a geometric plane, the defined positions moving over time.

9. The device according to claim 8, wherein the device is integrated into a chair and one of the force feedback devices is integrated into the left armrest, the right armrest and the headrest, respectively.

10. The device according to claim 9, wherein at least one further force feedback device is integrated into at least one legrest.

11. The device according to claim 9, further comprising a control unit that generates control signals to control the at least three force feedback devices dependent on each other in a way that the movements of the fixation points of the at least three force feedback devices provide six degrees of freedom movement to an object fixed between the three fixation points.

12. Control unit configured for controlling a haptic device, wherein the control unit comprises at least one processor configured for:

determining a three dimensional acceleration component corresponding to a movement to be simulated;

determining a three dimensional velocity component corresponding to the movement to be simulated;

generating control signals for controlling at least three force feedback devices, wherein each of the at least three force feedback devices provides three dimensional force effects to a fixation point associated with each of the three force feedback devices, the at least three force feedback devices being arranged at defined positions with regard to each other, the defined positions moving over time.

13. Computer program product comprising instructions of program code for executing steps of the method according to claim 1, when said program is executed on a computer.

14. The control unit according to claim 12, wherein the at least one processor is further configured for determining three dimensional displacement of each fixation point depending on the three dimensional acceleration component and the three dimensional angular velocity.

15. The control unit according to claim 14, wherein the at least one processor is further configured for applying a scaling factor to scale the three dimensional displacements to be determined such that the workspace of the force feedback devices is utilized.

16. The control unit according to claim 12, wherein the at least one processor is further configured for determining the three dimensional displacements of the three fixation points under the assumption that the fixation points are located in a left armrest, a right armrest and a headrest of a chair, respectively.

17. The control unit according to claim 12, wherein the determining of the three dimensional displacement of each fixation point is based on a skeleton model.

18. The control unit according to claim 12, wherein the movement to be simulated being based on at least part of a movie or gaming content.

19. The control unit according to claim 12, wherein the at least one processor is configured for controlling back the movement to be simulated according to said at least part of a movie or gaming content.

* * * * *